(12) United States Patent
Taguchi et al.

(10) Patent No.: US 6,891,689 B2
(45) Date of Patent: May 10, 2005

(54) APPARATUS FOR READING DATA

(75) Inventors: Masakazu Taguchi, Kawasaki (JP);
Akihiro Itakura, Kawasaki (JP);
Akiyoshi Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 331 days.

(21) Appl. No.: 09/818,766

(22) Filed: Mar. 27, 2001

(65) Prior Publication Data

US 2002/0060872 A1 May 23, 2002

(30) Foreign Application Priority Data

Nov. 21, 2000 (JP) .......................................... 2000-354915

(51) Int. Cl.[7] ............................ G11B 5/09; G11B 27/36
(52) U.S. Cl. ............................ 360/51; 360/31; 360/53
(58) Field of Search ............................ 360/51, 53, 46, 360/31; 714/400, 769, 795; 375/340, 371; 324/76.19

(56) References Cited

U.S. PATENT DOCUMENTS

| | | | | |
|---|---|---|---|---|
| 4,081,844 A | * | 3/1978 | Devore et al. ................. 360/48 |
| 4,525,840 A | * | 6/1985 | Heinz et al. ................... 386/49 |
| 4,777,542 A | * | 10/1988 | Ozaki .......................... 360/48 |
| 4,811,126 A | * | 3/1989 | Suzuki et al. ................. 360/51 |
| 4,896,337 A | * | 1/1990 | Bushy, Jr. ..................... 375/371 |
| 5,041,921 A | * | 8/1991 | Scheffler ...................... 360/13 |
| 5,056,116 A | * | 10/1991 | Shimada et al. ............. 375/340 |
| 5,218,454 A | * | 6/1993 | Nagawasa et al. ............ 386/99 |
| 5,600,662 A | * | 2/1997 | Zook ........................... 360/49 |
| 5,938,791 A | * | 8/1999 | Narahara ..................... 714/795 |
| 6,072,645 A | * | 6/2000 | Sprague ......................... 360/5 |
| 6,134,064 A | * | 10/2000 | Sato et al. ..................... 360/51 |
| 6,396,254 B1 | * | 5/2002 | Feyh et al. ................ 324/76.19 |
| 6,487,672 B1 | * | 11/2002 | Byrne et al. ................ 713/400 |
| 6,546,518 B1 | * | 4/2003 | Leung et al. ................ 714/769 |

* cited by examiner

*Primary Examiner*—Sinh Tran
*Assistant Examiner*—Glenda P. Rodriguez
(74) *Attorney, Agent, or Firm*—Greer, Burns & Crain, Ltd.

(57) ABSTRACT

In an apparatus for reading recorded data, the apparatus, a read signal is sampled from recorded data of a recording medium by synchronizing with a first clock signal. A sample value obtained by the sampling part is stored and also the sample value from the first storing part is retrieved by synchronizing a second clock signal different from the first clock signal and maximum likelihood data is detected by processing the sample value in accordance with a predetermined algorithm. The recorded data is read based on the detected data.

14 Claims, 4 Drawing Sheets

APPARATUS FOR READING DATA

BACKGROUND OF THE INVENTION

1. Field of the Invention

The present invention generally relates to apparatuses for reading data recorded on a recording medium, and more particularly to an apparatus for reading data recorded on a recording medium in which data is repetitively detected to accurately read data without deteriorating effects of a data format.

2. Description of the Related Art

As a recording medium for a data recording and reading apparatus, a magnetic disk, a magnetic tape, an optical disk, a magneto-optical disk or the like has been provided. Data are recorded on any one of the recording mediums by magnetized marks and then are permanently maintained for a longer time than data recorded on a semiconductor memory. Also, in order to manage a large amount of information such as a graphic or an image, the above recoding media are essential to record information for a computer.

For example, a conventional data recording and reading apparatus records data on a recording medium in accordance with a predetermined format as shown in FIG. 1. In the conventional data recording and reading apparatus, when a sector mark (SM) of an address information (ID) part formed by pre-pits is detected, an ID read gate signal (IDRG) is turned ON and then data recorded in the ID part are detected. When data of the ID part is detected and an optical disc controller (ODC) recognizes a target sector, the ODC applies a data (MO) read gate signal (MORG) to read data recorded on a data (MO) part.

In a configuration of a conventional read channel system as shown in FIG. 2, in a case in which the ID part is formed by pre-pits on a recording medium 10, a signal is output based on a strength of a beam reflected to a detector 19. In a case of MO data recorded on the recording medium 10, a signal is output to the detector 19 based on a rotation angle of the reflected beam. Then, the ID read gate signal or the MO read gate signal is output and a multiplexer (MUX) 13 selects a read signal for the ID part or the MO part. After the multiplexer 13 selects the read signal, a waveform of the read signal is adjusted by an amplifier (Amp) 11 or 12, an AGC (Automatic Gain Control) 14, a LPF (Low Pass Filter) 15 and an equalizer (EQ) 16. Also, an ADC (A/D converter) 18 samples the read signal by a clock synchronized at a PLL (Phase-Locked Loop) 17. Then, a PRML (Partial Response Maximum Likelihood) scheme or a recursive decoding process is conducted for sample data by the detector 19 and a decoder 20. In the conventional read channel system, the clock itself synchronized at the PLL 17 is used to detect read data. In a case of the PRML scheme in which a recursive detection is not conducted, a gap (in FIG. 1) is provided between the ID part and the MO part, for a delay time from a detection of the ID part to an output of the MO read gate signal for detecting the MO part. Thus, a data process can be consecutively conducted.

However, the configuration of the conventional read channel system has the following disadvantages:

In a conventional data detection method, a read process for reading data sampled from the read signal and a data detection process for detecting the most likelihood value from a sample value read in the read process are conducted alternately and continuously. In this case, for example, if the data detection for the ID part is recursively conducted, a time from recognition of the ID part to the output of the MO read gate signal becomes longer. Thus, if a longer gap is provided to realize the above recursive process, a format effect is deteriorated. On the other hand, without providing the longer gap, when data recorded on the MO part is recursively detected, it fails to detect data of the ID part.

As described above, in the conventional data detection method in which the read process and the detection process are conducted alternately and continuously, there is a problem that the detection process can not be conducted without effect of a process time of the read process. Thus, it is difficult to apply the above recursive process that can improve a data detection performance. The detection process is limited.

SUMMARY OF THE INVENTION

It is a general object of the present invention to provide apparatuses for reading data in which the above-mentioned problems are eliminated.

A more specific object of the present invention is to provide an apparatus for reading recorded data, in which the apparatus can conduct a data detection process based on a read signal read by a read process without deteriorating an effect of a data format for recording data and limiting by the read process.

The above objects of the present invention are achieved by the apparatus for reading recorded data, the apparatus including: a sampling part sampling a read signal from recorded data of a recording medium by synchronizing with a first clock signal; a first storing part consecutively storing a sample value obtained by the sampling part; and a data detecting part retrieving the sample value from the first storing part by synchronizing a second clock signal different from the first clock signal and detecting data by processing the sample value in accordance with a predetermined algorithm, so that the recorded data is read based on the data detected by the data detecting part.

According to the present invention, in the apparatus for reading recorded data, the first storing part is provided to store the sample value and a read process (in a read system) until obtaining the read signal can be conducted by synchronizing with one clock different from another clock which a detection process (in a detection system) for decoding the data recorded on the recording medium based on a maximum likelihood data of the sample value is conducted by synchronizing. Therefore, one process in the read system and another process in the detection system can be separately conducted.

Therefore, the read process in the read system can be affected by the detection process in the detection system and also the detection process can be recursively conducted for the same sample value once or more than once. Thus, it is not required to change the data format for recording data and it is possible to conduct the detection process that is not limited by the read process.

For example, the detection process implements a Viterbi detection scheme.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

[First Embodiment]

A first embodiment according to the present invention will now be described with reference to figures.

Figure 3:
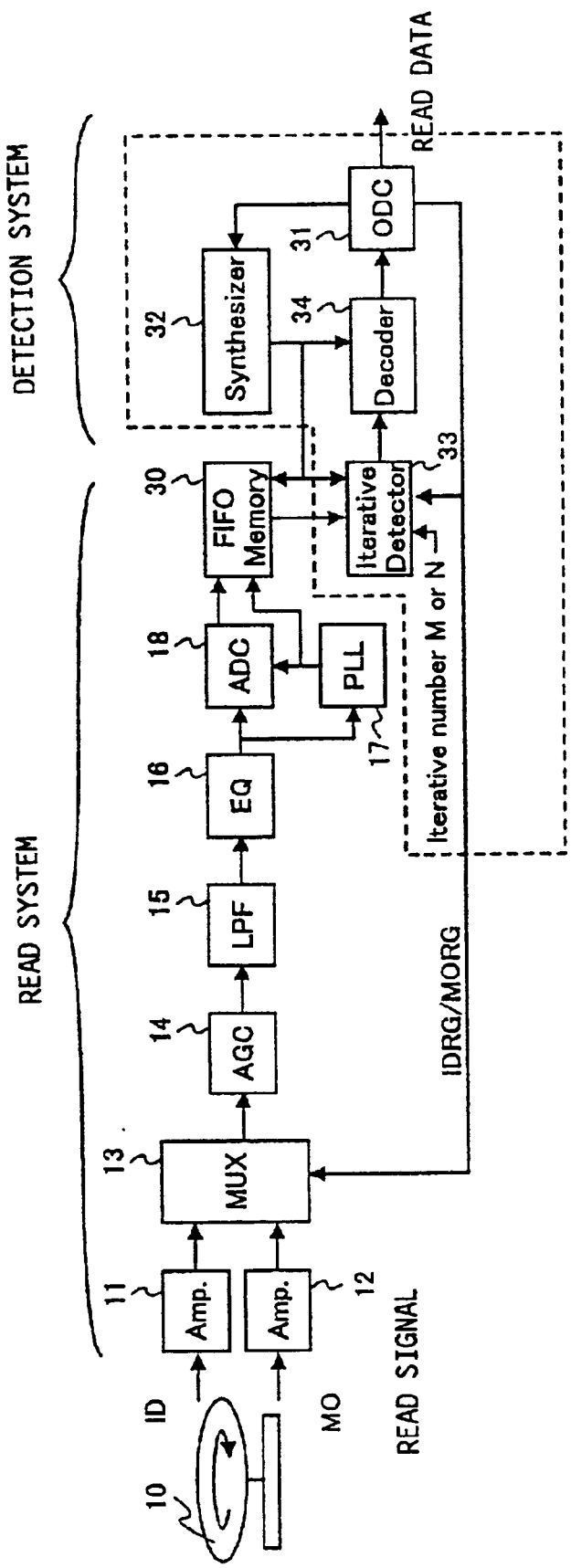
FIG. 3 is a diagram showing a circuit configuration of a read channel system according to the embodiment of the present invention.

For example, a read channel system for an apparatus for reading data is configured as shown in FIG. 3.

Figure 2:
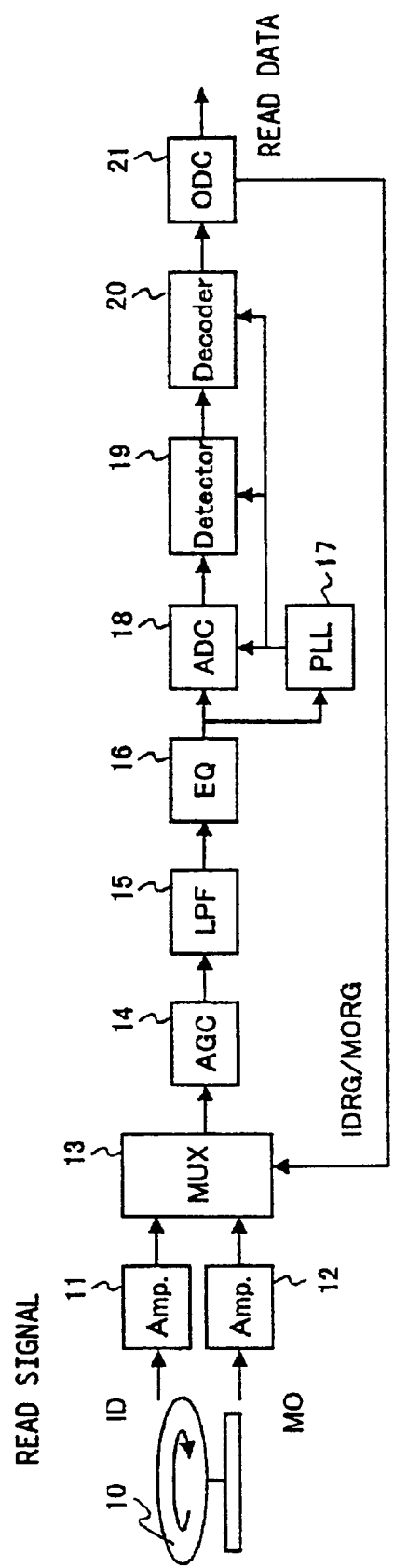
FIG. 2 is a diagram showing a circuit configuration of a conventional read channel system.

FIG. 3 is a diagram showing a circuit configuration of the read channel system according to the first embodiment of the present invention. In FIG. 3, circuits that are the same as the ones in FIG. 2 are indicated by the same reference numerals.

In FIG. 3, the read channel system 100 includes the recording medium 10, the Amps (amplifiers) 11 and 12, the MUX (multiplexer) 13, the AGC (Automatic Gain Control) 14, the LPF (Low Pass Filter) 15, the EQ (equalizer) 16, the PLL (Phase-Locked Loop) 17, a FIFO (First-In First-Out) memory 30, an ODC (optical disc controller) 31, a synthesizer 32, an iterative detection 33 and a decoder 34.

In FIG. 3, a read signal corresponding to data recorded on the ID part formed by pre-pits or data recorded on the MO part is output from a magneto-optical disk or an optical disk. The MUX (multiplexer) 13 is switched by the ID read gate signal (IDRG) or the MO read gate signal (MORG). Then, a waveform of the read signal is adjusted by the AGC (Automatic Gain Control) 14, the LPF (Low Pass Filter) 15 and the EQ (equalizer) 16 and the read signal is sampled by the ADC (A/D converter) 18 using the clock provided from the PLL (Phase-Locked Loop) 17. The sample data sampled by the ADC 18 is accumulated in the FIFO (First-In First-Out) memory 30.

In this embodiment, a partial configuration including the Amps (Amplifier) 11 and 12, the MUX 13, the AGC 14, the LPF 15, the EQ 16, the PLL 17, the ADC 18 and the FIFO memory 30 is defined as a read system.

The ODC (optical disc controller) 31 controls the synthesizer 32 to output an ID part detection clock for the ID part or a MO part detection clock for the MO part. Also, the ODC 31 sends an iterative number M or N to the iterative detector 33 and then the iterative detector 33 starts to recursively detect data. The iterative detector 33 retrieves data from the FIFO memory 30 by synchronizing with the clock provided from the synthesizer 32, and then starts to detect data N times. When the iterative detection is completed, the decoder 34 decodes data by synchronizing with the detection clock provided from the synthesizer 32, and then decoded data is provided to the ODC 31. The ODC 31 outputs the decoded data as read data.

The iterative detector 33 is a circuit for detecting data by implementing a Viterbi detection scheme.

In this embodiment, another partial configuration including the ODC 31, the synthesizer 32, the iterative detector 33 and the decoder 34 is defined as a detection system.

Figure 1:
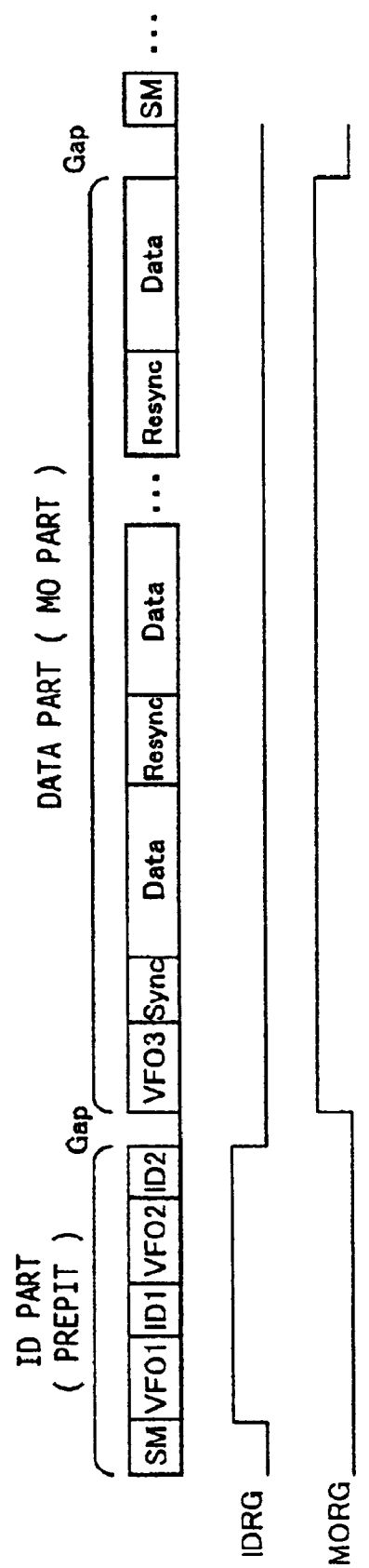
FIG. 1 is a diagram showing a format configuration for reading data and control signals.

In a case of reading data recorded on the recording medium 10 in the format configuration as shown in FIG. 1, the ODC 31 controls the MUX 13 to switch to the Amp 11 for reading the ID part when a sector mark (SM) is detected. That is, in FIG. 1, the ID read gate signal (IDRG) is turned ON in response to a first synchronous mark (VFO1) and then data of a first ID area (ID1) is read. As described above, a waveform of a read signal of the first ID area (ID1) is adjusted by the AGC 14, the LPF 15 and the EQ 16. The read signal is sampled by the ADC 18 using a clock provided from the PLL 17 and then the sample data is stored in the FIFO memory 30.

The ODC 31 indicates to the synthesizer 32 to output the clock for the ID part detection. In response to the indication of the ODC 31, the synthesizer 32 outputs the clock for the ID part detection to the FIFO memory 30, the iterative detector 33 and the decoder 34. Also, the ODC 31 sends the iterative number M for the ID part to the iterative detector 33.

The sample data stored in the FIFO memory 30 is recursively detected by the iterative detector 33 and decoded by the decoder 34 by synchronizing with the clock for the ID part. Then, the sample data is output as read data from the ODC 31.

While the iterative detection and the decoding process are conducted for the sample data of the first ID part, a read signal for a last ID area (ID2) is amplified by the Amp 11, and sample data for last ID area (ID2) obtained through the AGC 14, the LPF 15, the EQ 16 and ADC 18 are consecutively accumulated in the FIFO memory 30, simultaneously.

The iterative detection and the decoding process for the last ID area (ID2) are completed while the gap after the last ID area (ID2) in FIG. 1 is being scanned. That is, the ODC 31 sends the iterative number M for ID part possible to complete the iterative detection and the decoding process during the gap after the last ID area (ID2).

When a start of the gap after the last ID area (ID2) shown in FIG. 1 is detected, the ID read gate signal is turned OFF and the ODC 31 controls the MUX 13 to switch from the Amp 11 to the Amp 12. After the gap, in response to a third synchronous mark (VFO3), the MO read gate signal (MORG) for the data (MO) part is turned ON. After that, data recorded on the MO part in FIG. 1 is read while the read process synchronizes a Sync and Resyncs, which are provided to sychronize.

Similarly, a read signal of the MO part is processed through the read system and then is accumulated in the FIFO memory 30.

On the other hand, in the detection system, in response to the indication from the ODC 31, the synthesizer 32 provides a clock for detecting the MO part to the FIFO memory 30, the iterative detector 33 and the decoder 34. Also, the iterative detector 33 retrieves sample data accumulated in the FIFO memory 30 and recursively detects the sample data based on the iterative number N indicated by the ODC 31. After that, read data for the MO part of the recording medium 10 is output in accordance with the same process.

The read signal from the MO part of the recording medium 10 is processed in the read system and in the detection system simultaneously.

When the gap, after a last data block sectioned by the Resyncs is detected, the read gate signal for the MO part is turned OFF.

The iterative detection and the decoding process for sample data of the last data block is completed during the gap after the last data block shown in FIG. 1. That is, the ODC 31 sends the iterative number N for the MO part possible to complete the iterative detection and the decoding process during the gap provided after the last data block.

As described above, the FIFO memory 30 provided between the read system and the detection system is used as a buffer storing data read by the read system. Thus, by providing the FIFO memory 30, it is possible to process data in the read system independent of the detection system. That is, the read process in the read system and the detection process in the detection system are simultaneously processed.

In addition, the read channel system 100 is configured so that the iterative numbers M and N are indicated by the ODC 31 in a condition in that the iterative detection for data of the ID part or the MO part can be completed. Therefore, it is possible to set each of the iterative number M and N.

That is, it is determined that the clock output from the synthesizer 32 of the detection system is faster than the another clock output from the PLL 17. In a case of using a MSR (Magnetic Super Resolution) medium, a smaller bit is recorded by an effect of the MSR. However, the smallest pre-pit, which is recorded in the ID part without the effect of the MSR, is still bigger than the bit formed by the effect of the MSR.

Accordingly, a frequency of the clock in the read channel system 100 is, for example, categorized into four kinds of frequencies: an ID read frequency fIDrdclk, an ID detection frequency fIDdetclk, a MO read frequency fMOrdclk and a MO detection frequency fMOdetclok. It should be noted that the ID detection frequency fIDdetclk is higher than the ID read frequency fIDrdclk. The ID read frequency fIDrdclk and the MO read frequency fMOrdclk are corresponded to frequencies at the PLL 17. The ID detection frequency fIDdetclk and the MO detection frequency fMOdetclk are corresponded to frequencies at the synthesizer 32.

For example, the iterative number N for the MO part is defined as an integer where:

$$N \times \text{data amount} \times (1/fMOdetclk) \leq \text{data amount} \times (1/fMOrdclk).$$

The ODC 31 defines the iterative number M so that the iterative detection using the ID detection frequency fIDdetclk for the sample data of the last ID area (ID2) is completed during the gap after the last ID area (ID2). Also, similarltly, the MO detection frequency fMOdetclk is higher than the MO read frequency fMOrdclk. For example, the ODC 31 defines the iterative number N so that the iterative detection using the MO detection frequency fMOdetclk for the sample data of the last data block is completed during the gap after the last data block.

As described above, each of the iterative numbers M and N can be separately determined based on characteristics of data recorded on the ID part or the MO part.

In addition, it is not required to change the conventional format and it is not needed to degrade the format effect in order to conduct the iterative detection.

In the configuration of the read channel system 100 shown in FIG. 3, the PLL 17 is synchronized with the read signal, but the PLL 17 can be synchronized with a clock pit formed on the recording medium 10 to generate a reference clock (an external clock method).

[Second Embodiment]

Figure 4:
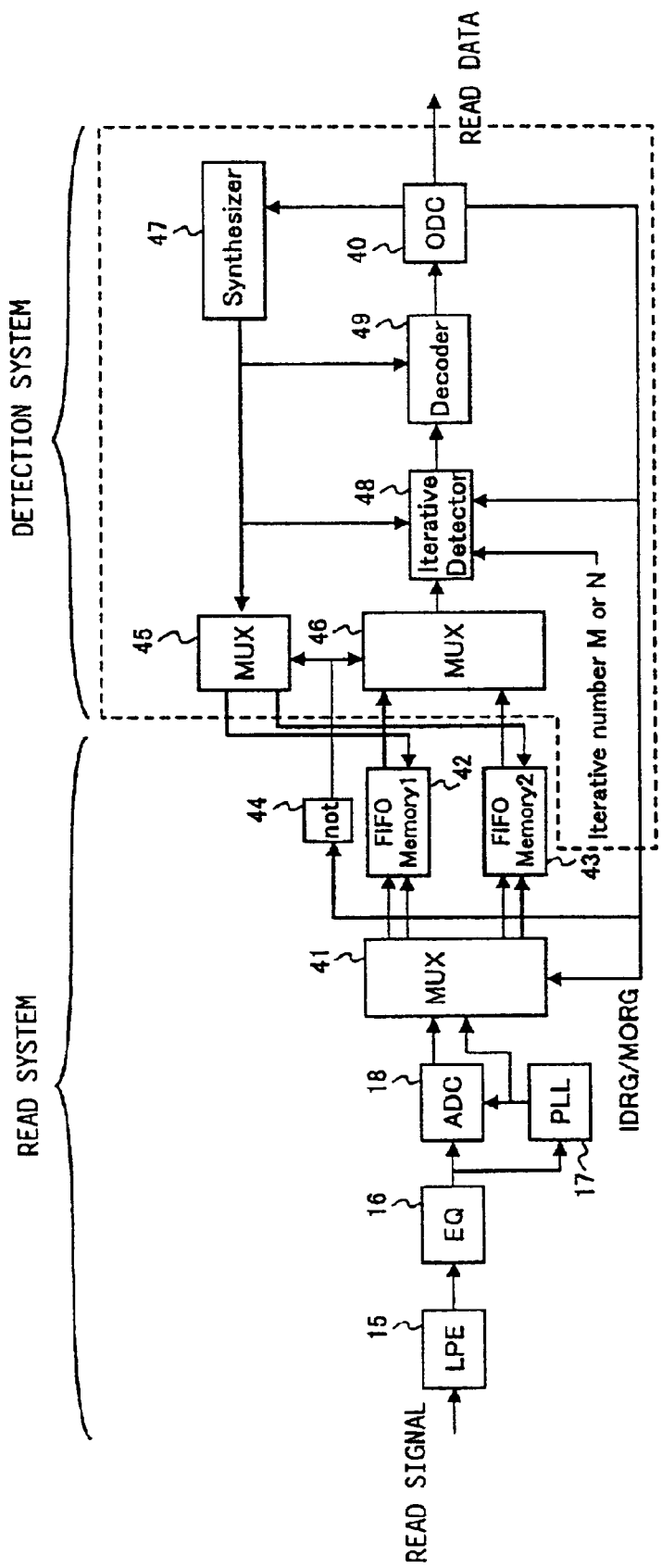
FIG. 4 is a diagram showing another circuit configuration of the read channel system according to the embodiment of the present invention.

Alternatively, the read channel system 100 in the apparatus for reading data can be configured as shown in FIG. 4, as a read channel system 200.

FIG. 4 is a diagram showing another circuit configuration of the read channel system according to a second embodiment of the present invention. In FIG. 4, circuits that are the same as the ones in FIG. 3 are indicated by the same reference numerals and a partial circuit configuration from the recording medium 10 to the AGC 14 that is the same as the one in FIG. 3 is omitted.

In the read channel system 200 in FIG. 4, the waveform of the read signal is adjusted by the LPF 15 and the EQ 16 and the read signal is sampled by the ADC 18 using the clock, which is synchronized with the read signal by the PLL 17.

Referring to FIG. 4, an ODC (optical disc controller) 40 controls a MUX (multiplexer) 41 by the ID read gate signal (IDRG) or the MO read gate signal (MORG) to switch to a FIFO (First-In First-Out) memory 42 or 43 and then sample data is stored in the FIFO memory 42 or 43. Also, the ID read gate signal (IDRG) or the MO read gate signal (MORG), which are output from the ODC 40, is supplied to a not-circuit 44 to be inversed and then supplied to a MUX (multiplexer) 45 and a MUX (multiplexer) 46.

On the other hand, the ODC 40 indicates a synthesizer 47 to output an ID detection clock for an ID part detection or a MO detection clock for a MO part detection. Also, the ODC 40 indicates the iterative number M or N to an iterative detector 48.

In response to the indication from the ODC 40, the synthesizer 47 outputs the ID or MO detection clock to the MUX 45, the iterative detector 48 and a decoder 49.

The MUX 45 supplies the ID or MO detection clock, which is output from the synthesizer 47, to the FIFO memory 42 or 43 based on an inversed signal from the not-circuit 44. For example, when the sample data for the ID part is stored in the FIFO memory 42 switched by the MUX 41, the MUX 45 supplies the MO detection clock from the synthesizer 47 to the FIFO memory 43 by the inversed signal from the not-circuit 44. Similarly, the MUX 46 retrieves the sample data for the MO part, which are stored in the FIFO memory 43, by the inversed signal from the not-circuit 44, and the iterative detector 48 conducts the iterative detection based on the iterative number N defined by the ODC 40 while synthesizing with the MO detection clock from the synthesizer 47.

When the iterative detector 48 completes the iterative detection, the decoder 49 decodes detected data while synthesizing with the MO detection clock supplied by the synthesizer 47, and then decoded data is supplied to the ODC 40. The ODC 40 outputs the decoded data as read data.

In this circuit configuration of the read channel system 200, a partial circuit configuration including the Amps 11 and 12, the MUX 13, the AGC 14, the LPF 15, the EQ 16, the PLL 17, the ADC 18 and the FIFO memories 42 and 43 is defined as a read system.

Also, another partial circuit configuration including the MUXs 45 and 46, the synthesizer 47, the iterative detector 48, the detector 49 and the ODC 40 is defined as a detection system.

In a case in which data recorded on the recording medium 10 in the format configuration as shown in FIG. 1 are read, when the ODC 40 detects the sector mark (SM), the ODC 40 controls similar process conducted in the circuit configuration of the read channel system 100 and then starts to read data of the first ID area (ID1). In response to the indication for reading the ID part from the ODC 40, the sample data sampled by the ADC 18 is stored, for example, in the FIFO memory 42 switched by the MUX 41. In the same method, data recorded on the second ID area (ID2) are read, sampled and then stored in the FIFO memory 42.

When the data of the second ID area (ID2) is completed to read, the ODC 40 outputs the MO read gate signal (MORG) to the MUX 13 (not shown in FIG. 4), the MUX 41, the not-circuit 44 and the iterative detector 48. On the other hand, the ODC 40 sets the iterative number M for the ID detection to the iterative detector 48 and also indicates the synthesizer 47 to output the ID detection clock for the ID detection. The synthesizer 47 outputs the ID detection clock to the MUX 45, the iterative detector 48 and the decoder 49.

Therefore, the MUX 41 accumulates the sample data for the MO part to the FIFO memory 43. On the other hand, the MUX 46 retrieves the sample data for the ID part from the FIFO memory 42, and the iterative detector 48 detects the sample data supplied by the MUX 46 M times by synchronizing with the ID detection clock for the ID detection. After the sample data is detected M times, the ODC 40 outputs the sample data as the read data.

When all data of the MO part is completed to read, the ODC 40 outputs the ID read gate signal (IDRG). Simultaneously, the ODC 40 indicates to the synthesizer 47 to output the MO detection clock for the MO detection and sends the iterative number N for the MO detection to the iterative detector 48. Therefore, the MUX 41 accumulates the sample data for the ID part in the FIFO memory 42. On the other hand, the MUX 46 retrieves the sample data from the FIFO memory 43 while the MUX 46 synchronizes with the MO detection clock for the MO detection. The sample data retrieved by the MUX 46 is detected by the iterative detector 48 N times and then is decoded by the decoder 49. Then, the ODC 40 outputs the sample data as the read data.

Similar to the frequencies in FIG. 3, the frequency fIDrdclk for the ID part in the read system and the frequency fMOrdclk for the MO part in the read system corresponds to the frequencies of the PLL 17, and the frequency fIDdetclk for the ID part in the detection system and the frequency fMOdetclk in the detection system correspond to the frequencies of the synthesizer 47.

For example, the iterative number M for the ID part detection and the iterative number N for the MO part detection are defined as integers by the ODC 40 where:

$M \times$ data amount of ID part$\times (1/fIDdetclk) \leq$ data amount of MO part$\times (1/fMOrdclk)$, $N \times$ data amount of MO part$\times (1/fMOdetclk) \leq$ data amount of ID part$\times (1/fIDrdclk)$.

As described above, the FIFO memories 42 and 43 are provided. Thus, the sample data of the ID part can be accumulated in the FIFO memory 42 while another sample data of the MO part are retrieved from the FIFO memory 43 and the iterative detection is conducted for the retrieved sample data. On the other hand, the sample data for the MO part can be accumulated in the FIFO memory 43 while another sample data for the ID part are retrieved from the FIFO memory 42 and the iterative detection is conducted for the retrieved sample data.

Moreover, in this circuit configuration of the read channel system 200, clocks can be separately supplied for each of the read system and the detection system. Therefore, it is possible to conduct the iterative detection for the detection system without changing the format configuration.

In the read channel systems 100 and 200 shown in FIG. 3 and FIG. 4, in a case in which the same ID is recorded twice on the recording medium 10, that is, in a case in which the first ID area (ID1) and the second ID area (ID2) in FIG. 1 are identical or data of the ID part are recorded at larger pit than the MO part, since a SNR (Signal to Noise Ratio) shows a better condition, the iterative number may be set to be smaller.

In the circuit configuration of the read channel system 100 in FIG. 3, since the FIFO memory 30 are provided, it is possible to simultaneously conduct the processes of the read system and the detection system.

In addition, since the processes for the detection system can be conducted by the ID and MO detection clocks for the detection system, the iterative detection for the sample data can be realized without affecting the read system.

Moreover, the ODC 31 defines the iterative number M or N to the iterative detector 33 so as not to exceed a storing time for storing the sample data to the FIFO memory 30. Therefore, the iterative detection can be successfully completed based on the iterative number M or N sent from the ODC 31.

Furthermore, the ODC 31 defines a different iterative number M or N to the iterative detector 33 based on the sample data of the ID part (the address information part) or the MO part (the data part). Therefore, the iterative detection can be conducted the iterative number M or N times corresponding to a process speed for the ID part or the MO part.

Also, the ODC 31 defines the iterative number M or N to the iterative detector 33 not to exceed a scanning time for scanning the gap provided between the ID part and the MO part. Therefore, it is not required to change the format for recording data.

According to the circuit configuration of the read channel system 200, the FIFO memories 42 and 43 are provided to store the sample value. Therefore, simultaneously, the detection system can retrieve the sample data being stored in one FIFO memory 42 or 43 by the read system and can conduct the iterative detection while the read system stores another sample data in another FIFO memory 42 or 43.

In addition, the ID or MO detection clock in the detection system is faster than the clock for storing sample data in the read system. Therefore, the iterative detection can be conducted while the process in the read system is conducted.

Moreover, the ODC 40 defines the iterative number N to the iterative detector 48 so that a time required for iterative detection, in which data recorded on the MO part is recursively detected in the detection system, does not exceed a time required for storing the sample data of data (address information) recorded on the ID part in the read system. Therefore, the process in the detection system can be completed while the process in the read system is being conducted.

Furthermore, the ODC 40 defines the iterative number M to the iterative detector 48 so that a time required for iterative detection, in which data (address information) recorded on the ID part is recursively detected in the detection system, does not exceed a time required for storing the sample data of data recorded on the MO part in the read system. Therefore, the process in the detection system can be completed while the process in the read system is being conducted.

Consequently, according to the present invention, it is possible to conduct the iterative detection for data recorded on the recording medium 10 without changing the format for recording data. Also, it is possible to improve an accuracy of detecting the read data without deteriorating the format effect.

In the embodiment, the processes of the FIFO memory 30 in FIG. 3 and the FIFO memory 42 or 43 correspond to the first storing part, and the process of the FIFO memory 42 or 43 corresponds to the second storing part.

The processes of the iterative detector 33 in FIG. 3 and the iterative detector 48 in FIG. 4 correspond to the data detecting part.

The present invention is not limited to the specifically disclosed embodiments, variations and modifications, and other variations and modifications may be made without departing from the scope of the present invention.

The present application is based on Japanese Priority Application No. 2000-354915 filed on Nov. 21, 2000, the entire contents of which are hereby incorporated by reference.

What is claimed is:

1. An apparatus for reading recorded data, from a recording medium having an address part for recording an address and a data part for recording data in that the data part has a higher recording density than the address part, said apparatus comprising:

a first clock signal generating part generating a first clock signal;

a second clock signal generating part generating a second clock signal faster than the first clock signal;

a third clock signal generating part generating a third clock signal;

a fourth clock signal generating part generating a fourth clock signal faster than the third clock signal;

a sampling part sampling a read signal from recorded data of a recording medium by synchronizing with the first clock signal when the recorded data is the address recorded in the address part and by synchronizing with the third clock signal when the recorded data is the data in the data part;

a first storing part consecutively storing a sample value obtained by said sampling part; and a data detecting part retrieving the sample value from said first storing part by synchronizing the second clock signal when the sample value is sampled from the address recorded in the address part and by synchronizing the fourth clock signal when the sample value is sampled from the data recorded in the data part, and detecting data by processing the sample value in accordance with a predetermined algorithm, so that the recorded data is read based on the data detected by said data detecting part.

2. The apparatus as claimed in claim 1, wherein said data detecting part comprises a recursive process conducting part conducting a recursive process for the sample data retrieved from the first storing part in accordance with the predetermined algorithm so that maximum likelihood data is detected.

3. The apparatus as claimed in claim 2, wherein said recursive process conduction part conducts said recursive process based on an iterative number, which number is defined so that a required time required for completing said recursive process does not exceed a storing time required for storing the sample value by said first storing part.

4. The apparatus as claimed in claim 2, wherein said recursive process conduction part conducts said recursive process based on the iterative number, which number in a case in which the recorded data is the address recorded in the address part is different from that in a case in which the recorded data is the data recorded in the data part.

5. The apparatus as claimed in claim 2, wherein said recursive process conduction part conducts said recursive process based on an iterative number, which number is defined so that a required time required for completing said recursive process conducted does not exceed a scanning time required for scanning a gap provided between an address part recording an address of data and a data part recording the data.

6. The apparatus as claimed in claim 1, further comprising:

a second storing part consecutively storing a sample value obtained by said sampling part;

a first switching part switching to one of said first storing part and said second storing part;

a second switching part switching to another one of said first storing part and said second storing part, which is not switched to by said first switching part;

whereby one of said first storing part and said second storing part, which is switched to by said first switching part, stores the sample value, while said data detecting part retrieves the sample value from another one of said first storing part and said second storing part, which is switched to by said second switching part.

7. The apparatus as claimed in claim 6, wherein one of said first storing part and said second storing part, which is switched to by said first switching part, stores the sample value, while said data detecting part retrieves the sample value of data recorded in a data part from another one of said first storing part and said second storing part, which is switched to by said second switching part.

8. The apparatus as claimed in claim 6, wherein said data detecting part comprises a recursive process conducting part conducting a recursive process for the sample value, which is retrieved from one of said first storing part and said second storing part, which is switched by said second switching part, in accordance with the predetermined algorithm, and detecting the maximum likelihood data, by synchronizing with said second clock signal.

9. An apparatus for reading recorded data from a recording medium having an address part for recording an address and a data part for recording data in that the data part has a higher recording density than the address part, said apparatus comprising:

a first clock signal generating part generating a first clock signal;

a second clock signal generating part generating a second clock signal faster than the first clock signal;

a third clock signal generating part generating a third clock signal;

a fourth clock signal generating part generating a fourth clock signal faster than the third clock signal;

a sampling part sampling a read signal from recorded data of a recording medium by synchronizing with the first clock signal when the recorded data is the address recorded in the address part and by synchronizing with the third clock signal when the recorded data is the data recorded in the data part;

a first storing part consecutively storing a sample value obtained by said sampling part;

a data detecting part retrieving the sample value from said first storing part by synchronizing the second clock signal when the sample value is sampled from the address recorded in the address part and by synchronizing the fourth clock signal when the sample value is sampled from the data recorded in the data part, and detecting data by processing the sample value in accordance with a predetermined algorithm, so that the recorded data is read based on the data detected by said data detecting part;

a second storing part consecutively storing a sample value obtained by said sampling part;

a first switching part switching to one of said first storing part and said second storing part; and a second switching part switching to another one of said first storing part and said second storing part, which is not switched to by said first switching part;

whereby one of said first storing part and said second storing part, which is switched to by said first switching part, stores the sample value, while said data detecting part retrieves the sample value from another one of said first storing part and said second storing part, which is switched to by said second switching part;

wherein said data detecting part comprises a recursive process conducting part conducting a recursive process for the sample value, which is retrieved from one of said first storing part and said second storing part, which is switched to by said second switching part, in accordance with the predetermined algorithm, and detecting the maximum likelihood data, by synchronizing with said second clock signal when the sample value is sampled from the address recorded in the address part and by synchronizing the fourth clock signal when the sample value is sampled from the data recorded in the data part;

wherein said first clock signal and said third clock signal synchronizes with a timing of storing the sample value to either said first storing part or said second storing part, whichever one has been switched to by said first switching part.

10. An apparatus for reading recorded data, from a recording medium having an address part for recording an address and a data part for recording data in that the data part has a higher recording density than the address part, said apparatus comprising:

a first clock signal generating part generating a first clock signal;

a second clock signal generating part generating a second clock signal faster than the first clock signal;

a third clock signal generating part generating a third clock signal;

a fourth clock signal generating part generating a fourth clock signal faster than the third clock signal;

a sampling part sampling a read signal from recorded data of a recording medium by synchronizing with the first clock signal when the recorded data is the address recorded in the address part and by synchronizing with the third clock signal when the recorded data is the data recorded in the data part;

a first storing part consecutively storing a sample value obtained by said sampling part;

a data detecting part retrieving the sample value from said first storing part by synchronizing the second clock signal when the sample value is sampled from the address recorded in the address part and by synchronizing the fourth clock signal when the sample value is sampled from the data recorded in the data part, and detecting data by processing the sample value in accordance with a predetermined algorithm, so that the recorded data is read based on the data detected by said data detecting part;

a second storing part consecutively storing a sample value obtained by said sampling part;

a first switching part switching to one of said first storing part and said second storing part; and a second switching part switching to another one of said first storing part and said second storing part, which is not switched to by said first switching part;

whereby one of said first storing part and said second storing part, which is switched to by said first switching part, stores the sample value, while said data detecting part retrieves the sample value from another one of said first storing part and said second storing part, which is switched to by said second switching part;

wherein said data detecting part comprises a recursive process conducting part conducting a recursive process for the sample value, which is retrieved from one of said first storing part and said second storing part, which is switched to by said second switching part, in accordance with the predetermined algorithm, and detecting the maximum likelihood data, by synchronizing with said second clock signal when the sample value is sampled from the address recorded in the address part and by synchronizing the fourth clock signal when the sample value is sampled from the data recorded in the data part;

wherein said recursive process conduction part conducts said recursive process based on an iterative number, which number is defined so that a required time required for completing said recursive process does not exceed a storing time required for storing the sample value by one of said first storing part and said second storing part, which is switched by said first switching part.

11. An apparatus for reading recorded data from a recording medium having an address part for recording an address and a data part for recording data in that the data part has a higher recording density than the address part, said apparatus comprising:

a first clock signal generating part generating a first clock signal;

a second clock signal generating part generating a second clock signal faster than the first clock signal;

a third clock signal generating part generating a third clock signal;

a fourth clock signal generating part generating a fourth clock signal faster than the third clock signal;

a sampling part sampling a read signal from recorded data of a recording medium by synchronizing with the first clock signal when the recorded data is the address recorded in the address part and by synchronizing with the third clock signal when the recorded data is the data recorded in the data part;

a first storing part consecutively storing a sample value obtained by said sampling part;

a data detecting part retrieving the sample value from said first storing part by synchronizing the second clock signal when the sample value is sampled from the address recorded in the address part and by synchronizing the fourth clock signal when the sample value is sampled from the data recorded in the data part, and detecting data by processing the sample value in accordance with a predetermined algorithm, so that the recorded data is read based on the data detected by said data detecting part, a second storing part consecutively storing a sample value obtained by said sampling part;

a first switching part switching to one of said first storing part and said second storing part; and a second switching part switching to another one of said first storing part and said second storing part, which is not switched to by said first switching part;

whereby one of said first storing part and said second storing part, which is switched to by said first switching part, stores the sample value, while said data detecting part retrieves the sample value from another one of said first storing part and said second storing part, which is switched to by said second switching part;

wherein said data detecting part comprises a recursive process conducting part conducting a recursive process for the sample value, which is retrieved from one of said first storing part and said second storing part, which is switched to by said second switching part, in accordance with the predetermined algorithm, and detecting the maximum likelihood data, by synchronizing with said second clock signal when the sample value is sampled from the address recorded in the address part and by synchronizing the fourth clock signal when the sample value is sampled from the data recorded in the data part;

wherein said recursive process conduction part conducts said recursive process based on an iterative number, which number is defined so that a required time, which is required for retrieving the sample value of the data part from one of said first storing part and said second storing part, which one is switched to by said second switching part, and completing said recursive process, does not exceed a storing time, which is required for storing the sample value of the address part to another one of said first storing part and said second storing part, which one is switched to by said first switching part.

12. The apparatus as claimed in claim 11, wherein said iterative number is set when one of said first storing part and said second storing part, which one is switched to by said first switching part, stores the sample value of the address part.

13. An apparatus for reading recorded data from a recording medium having an address part for recording an address and a data part for reecording data in that the data part has a higher recording density than the address part, said apparatus comprising:

a first clock signal generating part generating a first clock signal;

a second clock signal generating part generating a second clock signal faster than the first clock signal;

a third clock signal generating part generating a third clock signal;

a fourth clock signal generating part generating a fourth clock signal faster than the third clock signal;

a sampling part sampling a read signal from recorded data of a recording medium by synchronizing with the first clock signal when the recorded data is the address recorded in the address part and by synchronizing with the third clock signal when the recorded data is the data recorded in the data part;

a first storing part consecutively storing a sample value obtained by said sampling part;

a data detecting part retrieving the sample value from said first storing part by synchronizing the second clock signal when the sample value is sampled from the address recorded in the address part and by synchronizing the fourth clock signal when the sample value is sampled from the data recorded in the data part, and detecting data by processing the sample value in accordance with a predetermined algorithm, so that the recorded data is read based on the data detected by said data detecting part, a second storing part consecutively storing a sample value obtained by said sampling part;

a first switching part switching to one of said first storing part and said second storing part; and a second switching part switching to another one of said first storing part and said second storing part, which is not switched to by said first switching part;

whereby one of said first storing part and said second storing part, which is switched to by said first switching part, stores the sample value, while said data detecting part retrieves the sample value from another one of said first storing part and said second storing part, which is switched to by said second switching part;

wherein said data detecting part comprises a recursive process conducting part conducting a recursive process for the sample value, which is retrieved from one of said first storing part and said second storing part, which is switched to by said second switching part, in accordance with the predetermined algorithm, and detecting the maximum likelihood data, by synchronizing with said second clock signal when the sample value is sampled from the address recorded in the address part and by synchronizing the fourth clock signal when the sample value is sampled from the data recorded in the data part;

wherein said recursive process conduction part conducts said recursive process based on an iterative number, which number is defined so that a required time, which is required for retrieving the sample value of the address part from one of said first storing part and said second storing part, which one is switched to by said second switching part, and completing said recursive process, does not exceed a storing time, which is required for storing the sample value of the data part to another one of said first storing part and said second storing part, which one is switched by said first switching part.

14. The apparatus as claimed in claim 13, wherein said iterative number is set when one of said first storing part and said second storing part, which one is switched to by said first switching part, stores the sample value of the data part.

* * * * *